United States Patent
Meredith et al.

(10) Patent No.: US 10,035,080 B2
(45) Date of Patent: Jul. 31, 2018

(54) LIQUID PURIFICATION METHODS AND APPARATUS

(71) Applicants: AT&T Mobility II, LLC., Atlanta, GA (US); AT&T Intellectual Property I, L.P., Atlanta, GA (US)

(72) Inventors: Sheldon Kent Meredith, Roswell, GA (US); William C. Cottrill, Canton, GA (US); Jeremy T. Fix, Acworth, GA (US)

(73) Assignees: AT&T MOBILITY II LLC, Atlanta, GA (US); AT&T INTELLECTUAL PROPERTY I, L.P., Atlanta, GA (US)

( * ) Notice: Subject to any disclaimer, the term of this patent is extended or adjusted under 35 U.S.C. 154(b) by 864 days.

(21) Appl. No.: 14/518,720

(22) Filed: Oct. 20, 2014

(65) Prior Publication Data

US 2016/0107901 A1    Apr. 21, 2016

(51) Int. Cl.
| | |
|---|---|
| *B01D 5/00* | (2006.01) |
| *B01D 1/00* | (2006.01) |
| *C02F 1/04* | (2006.01) |
| *C02F 1/14* | (2006.01) |
| *C02F 1/18* | (2006.01) |
| *B01D 1/30* | (2006.01) |
| *C02F 103/08* | (2006.01) |

(52) U.S. Cl.
CPC ......... *B01D 5/0066* (2013.01); *B01D 1/0035* (2013.01); *B01D 1/0082* (2013.01); *B01D 1/30* (2013.01); *C02F 1/042* (2013.01); *C02F 1/14* (2013.01); *C02F 1/18* (2013.01); *C02F 2103/08* (2013.01); *C02F 2201/002* (2013.01); *C02F 2201/009* (2013.01); *Y02A 20/212* (2018.01)

(58) Field of Classification Search
CPC ...... B01D 1/0035; B01D 1/0082; B01D 1/30; B01D 5/006; B01D 5/0066; C02F 1/042; C02F 1/14; C02F 1/18; C02F 2103/08; C02F 2201/002; C02F 2201/009
See application file for complete search history.

(56) References Cited

U.S. PATENT DOCUMENTS

| | | | |
|---|---|---|---|
| 4,135,985 A | 1/1979 | La Rocca | |
| 4,495,034 A * | 1/1985 | Lucas | B01D 5/0066 159/903 |

(Continued)

FOREIGN PATENT DOCUMENTS

| | | |
|---|---|---|
| DE | 4239636 A1 | 5/1994 |
| DE | 202007004401 U1 | 7/2008 |

(Continued)

OTHER PUBLICATIONS

Pauley, "Concept Design: Solar Cucumber," http://www.philpauley.com/concept_design/sustainability/solar-cucumber/, 2014, 2 pages.

*Primary Examiner* — Renee Robinson
(74) *Attorney, Agent, or Firm* — Hanley, Flight & Zimmerman, LLC

(57) ABSTRACT

Liquid purification methods and apparatus are disclosed. An example apparatus includes a frame to define an interior space, the frame having an inner surface in contact with air of the interior space; a barrier positioned between a body of liquid and the interior space; and an absorber suspended from the frame to transfer liquid from the body of liquid into the interior space via an opening in the barrier.

11 Claims, 4 Drawing Sheets

(56) References Cited

U.S. PATENT DOCUMENTS

| | | |
|---|---|---|
| 4,504,362 A | 3/1985 | Kruse |
| 5,744,008 A | 4/1998 | Craven |
| 7,008,515 B1 | 3/2006 | Husson, Jr. et al. |
| 7,494,572 B2 | 2/2009 | Tonkin et al. |
| 2003/0038022 A1 | 2/2003 | Rogde |
| 2009/0200151 A1 | 8/2009 | Whisson |
| 2010/0051546 A1* | 3/2010 | Vuong ................ B01D 61/027 210/637 |
| 2012/0228114 A1 | 9/2012 | Joseph, III et al. |
| 2012/0234667 A1 | 9/2012 | Coots |
| 2014/0054159 A1 | 2/2014 | Bosch I Bosch |

FOREIGN PATENT DOCUMENTS

| | | |
|---|---|---|
| FR | 2483393 | 12/1981 |
| JP | S5624086 A | 3/1981 |
| JP | H04141287 A | 5/1992 |
| JP | 2009056343 A | 3/2009 |
| WO | 2011004416 A1 | 1/2011 |

\* cited by examiner

US 10,035,080 B2

LIQUID PURIFICATION METHODS AND APPARATUS

FIELD OF THE DISCLOSURE

This disclosure relates generally to treatment of liquids and, more particularly, to liquid purification methods and apparatus.

BACKGROUND

Purification of liquids typically involves removal of impurities. For example, salt water is desalinated to provide potable water.

Figure 1:
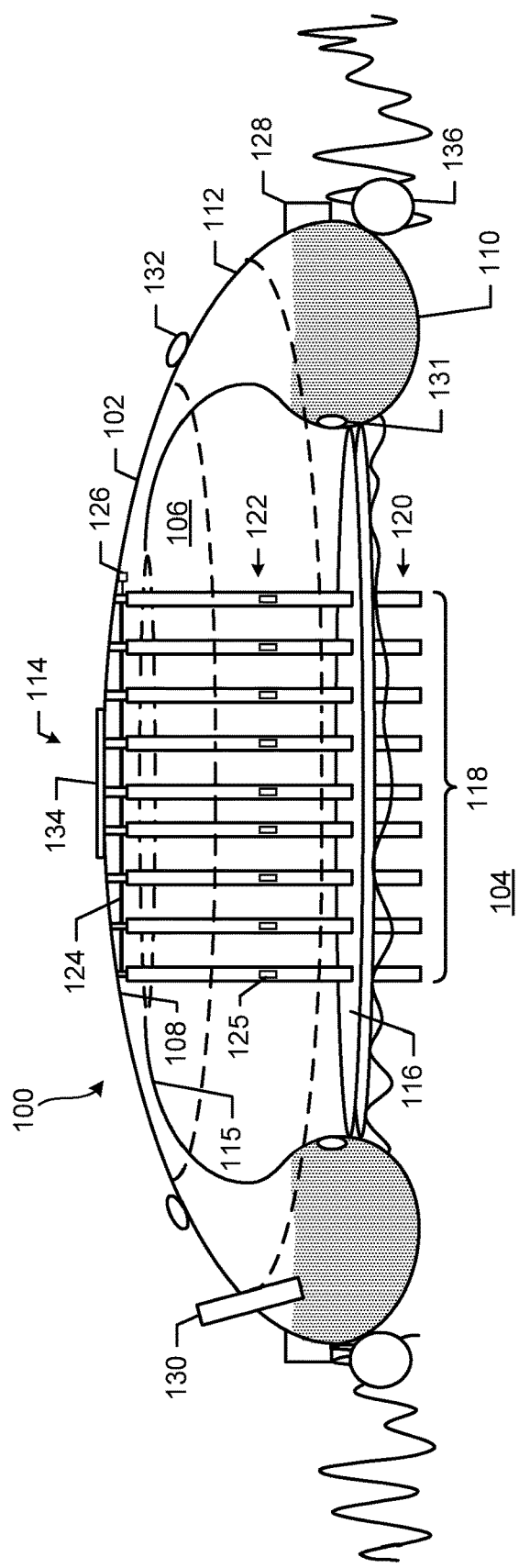
FIG. 1 is a schematic illustration of a purification and collection apparatus constructed in accordance with teachings of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Providing and/or obtaining sufficient amounts of fresh water in certain regions, environments, and/or economies presents challenges. Shortages of fresh water result from, for example, climate, increasing populations, pollution, and technologies that allow people to live in arid regions. Desalination is an example process that may alleviate such shortages. Desalination plants convert salt water to fresh water by removing salt from the salt water. However, desalination plants are costly to build and operate due to, for example, external energy source requirements (e.g., burning of fossil fuels for heating and/or cooling parts of the process), the need to deliver the salt water to the desalination plants, maintenance, labor, etc. In many instances, especially in the depressed economies in which fresh water shortages often exist, the costs of desalination plants preclude implementation, especially at large-scale production levels.

Example liquid purification methods and apparatus disclosed herein provide low cost, low maintenance, and highly sustainable purification and collection of liquids relative to known desalination plants. As disclosed in detail below in connection with FIGS. 1-4, examples disclosed herein rely on solar radiation, rather than fossil fuels, to heat an interior space defined by a structure or frame. Examples disclosed herein place non-purified liquid, such as salt water of a sea or ocean, within the interior space. Unlike known systems that delivery non-purified liquids to a desalination plant, sometimes over great distances, example structures disclosed herein float on a source of the non-purified liquid. Thus, examples disclosed herein do not require costly delivery of non-purified liquids. As the interior space provided by examples disclosed herein is heated, the non-purified liquid evaporates. Examples disclosed herein include one or more condensation collection surfaces that are cooler than the interior space. The condensation collection surfaces of examples disclosed herein are in fluid communication with one or more collection reservoirs such that the condensation, having been purified of salt via the evaporation and condensation processes, is stored separately from the non-purified source of liquid.

Notably, examples disclosed herein reduce or eliminate certain inefficiencies of the evaporation and condensation process. In particular, examples disclosed herein prevent wasteful return of purified liquids (e.g., water with the salt having been removed) to a non-purified source (e.g., a saline body of water) from which the purified liquids were extracted. For instance, examples disclosed herein recognize that a portion of the humid air in the heated interior space may condense on a surface of the source of non-purified liquid rather than condensing on the condensation collection surfaces. To prevent this inefficiency, examples disclosed herein employ one or more insulation bathers between the non-purified source of liquid and the interior space that is heated via solar radiation. The insulation barrier(s) of examples disclosed herein retain more heat than the surface of the non-purified liquid (e.g., the surface of the saline body of water). As a result, the temperature of the insulation barrier(s) is more similar to the temperature of the interior space than the surface of the non-purified liquid. Accordingly, much less (if any) condensation occurs on the insulation barrier(s) of examples disclosed herein relative to the cooler surface of the non-purified source of liquid. Depending on conditions, little or no condensation may occur on the insulation barrier(s) of examples disclosed herein. As a result, a higher percentage of the possible condensation occurs on the collection surfaces, thereby leading to more efficient collection of the purified liquid.

Moreover, examples disclosed herein enable use of the insulation barrier(s) that separate the non-purified source of liquid from the heated interior space. Examples disclosed herein employ one or more absorbers that transfer liquid into the interior space across the insulation barrier(s). In some examples disclosed herein, the absorbers are suspended from the frame that defines the interior space such that the absorbers transfer liquid into the interior space beyond a top surface of the insulation barrier(s), thereby enabling the liquid to be evaporated near the condensation collection surfaces. In some examples disclosed herein, a first portion of the respective absorbers is submerged in the non-purified source, while a second portion of the respective absorbers is suspended in the interior space. The example absorber(s) disclosed herein transfer the non-purified liquid from the first portion to the second portion via capillary action. Accordingly, the example absorbers disclosed herein positioned the non-purified liquid within the heated interior space and near the condensation collection surfaces even with the insulation barrier(s) being deployed. As such, examples disclosed herein supply the non-purified liquid to the evaporation and condensation environment while benefiting from the increased efficiencies provided by the insulation barrier(s) disclosed herein.

FIG. 1 is a diagram of an example purification structure 100 constructed in accordance with teachings of this disclosure. While the purification structure 100 of FIG. 1 is described below as purifying and collecting water, the example purification structure 100 can be used to purify and collect any suitable liquid. The example purification structure 100 of FIG. 1 includes a frame 102 composed of non-corrosive material(s) (e.g., corrosion-resistance metal(s) and/or plastic(s)) that is articulated or flexible to withstand wave action. The example frame 102 of FIG. 1 is dome-shaped. However, any suitable shape capable of flotation can be implemented. In some examples, the example frame 102 of FIG. 1 has an approximate (e.g., within a threshold) diameter of fifty (50) yards. However, the example frame 102 of FIG. 1 is scalable to any suitable size depending on, for example, a desired output amount. The example frame 102 of FIG. 1 includes one or more coatings, such as Teflon, at an interface with the body of water 104 to reduce accumulation of, for example barnacles.

The example frame 102 of FIG. 1 is to float on a body of saline water 104, such as an ocean, a sea, a lake, etc. As such, the example purification structure 100 is continuously provided with non-purified water without devoting resources to delivery of non-purified water to the purification structure 100. In the illustrated example of FIG. 1, the purification structure 100 is to float on the body of water 104 without mooring. Alternatively, the example purification structure 100 can be moored to, for example, a floor of the body of water 104. The example frame 102 of FIG. 1 defines an interior space 106. As solar radiation hits the example purification structure 100, the air in the interior space 106 is heated. The trapped air in the interior space 106 is heated enough to cause evaporation of water present the interior space 106. In the example of FIG. 1, the frame 102 is in contact with the body of water 104, which is cooler than the air in the interior space 106. Accordingly, inner surfaces 108 of the frame 102 are cooler than the air trapped in the interior space 106. As moisture of the air in the interior space 106 comes in contact with the relatively cooler inner surfaces 108 of the frame 102, the moist air condenses on the inner surfaces 108. Thus, the inner surfaces 108 are sometimes referred to herein as condensation collection surfaces 108. The example condensation collection surfaces 108 of FIG. 1 are pitched according to the domed shape of the example purification structure 100 such that the condensation formed on the condensation collection surfaces 108 runs downhill into a collection reservoir 110. In the example of FIG. 1, the reservoir 110 is defined by the frame 102 and occupies an outer perimeter of the purification structure 100. Thus, the example reservoir 110 of FIG. 1 stores water that has been desalinated via evaporation and condensation.

As the example reservoir 110 of FIG. 1 forms the outer perimeter of the frame 102, the example reservoir 110 is in direct contact with the body of water 104. Accordingly, the reservoir 110 and the purified water stored therein are cooled by the body of water 104. Because the purified water within the reservoir 110 is kept relatively cool compared to the interior space 106, the outgassing vapor pressure of the reservoir 110 is lower than the outgassing vapor pressure of the interior space 106. Thus, the water within the reservoir 110 does not evaporate and/or does not evaporate as quickly as the water present in the interior space 106.

To further cool the reservoir 110 to ensure that the water in the reservoir 110 remains in a liquid state, outer edges 112 of the frame 102 are provided with a first degree of reflectivity and a center portion 114 of the frame 102 is provided with a second degree of reflectivity less than the first degree of reflectivity. For example, in FIG. 1, the outer edges 112 of the frame 102 are painted white or mirrored, while the center portion 114 of the frame 102 is painted black to ensure a temperature gradient between the air in the interior space 106 and the air in the reservoir 110. Further, while wave action outside the perimeter of the purification structure 100 is mitigated inside the perimeter of the purification structure 100, some splashing may occur. To prevent splashing for contaminating the reservoir 110, the example frame 102 includes an annular lip 115.

One potential issue that may arise is condensation forming on the surface of the body of water 104 instead of the condensation collection surfaces 108. To prevent condensation from occurring on the surface of the body water 104, the example purification structure 100 of FIG. 1 includes an insulation barrier 116 positioned between the interior space 106 and the body of water 104. While the example of FIG. 1 includes the insulation barrier 116, any suitable number of insulation barriers can be implemented. The example insulation barrier 116 of FIG. 1 abuts the example reservoir 110 around an inner edge of the reservoir 110, thereby separating the air of the interior space 106 from the body of water 104.

Without the example insulation barrier 116 of FIG. 1, the cool surface of the body of water 104 would interact with the heated, humid air of the interior space 106, thereby causing at least some of the moisture in the air of the interior space 106 to condense on the surface of the body of water 104. The surface of the body of water 104 is cool because, for example, the water within the purification structure 100 is constantly flowing in and out of the purification structure 100. The condensation forming on the surface of the body of water 104 is lost fresh water and, thus, represents a waste or inefficiency of the purification process. To mitigate or eliminate this inefficiency, the example insulation barrier 116 of FIG. 1 provides a surface interacting with the air of the interior space 106 that is warmer than the surface of the body of water 104. In particular, the example barrier 116 of FIG. 1 is constructed of heat-retaining materials such as, for example, Styrofoam® or another material having similar characteristics as Styrofoam®.

As solar radiation heats the air of the interior space 106, the solar radiation also heats the insulation barrier 116. Unlike the body of water 104 that is constantly flowing in and out of the purification structure 100, the insulation barrier 116 is fixed within the purification structure 100 and, thus, is constantly subjected to the same solar radiation as the interior space 106. Accordingly, the difference in temperature between the air of the interior space 106 and the insulation barrier 116 is less than the difference in temperature between the air of the interior space 106 and the surface of the body of water 104 without the insulation barrier 116 in place. Thus, the example insulation barrier 116 of FIG. 1 increases a percentage of the humid air of the interior space 106 that condenses on the condensation collection surfaces 108 and, thus, the amount of fresh water stored in the reservoir 110.

However, the separation of the body of water 104 and the interior space 106 provided by the insulation barrier 116 prevents or reduces evaporation of the body of water 104. Put simply, the insulation barrier 116 blocks the evaporation into the interior space 106. To enable water from the body of water 104 to enter the interior space 106 with the insulation barrier 116 in place, the example purification structure 100 of FIG. 1 includes one or more absorbers 118.

While the example of FIG. 1 includes a plurality of absorbers 118, alternative implementations include a single absorber 118. The example absorbers 118 of FIG. 8 are mounted to the example frame 102 and pass through openings in the insulation barrier 116 to contact the body of water 104. In the illustrated example of FIG. 1, the absorbers 118 are suspended from the frame 102. The example absorbers 118 of FIG. 1 are constructed of material(s) capable of wicking liquid to transfer the liquid from one section of the respective absorbers 118 to another section of the respective absorbers 118 via capillary action. For example, the absorbers 118 may be constructed of cloth and/or sponge-like material. The example absorbers 118 of FIG. 1 have a wicking section 120 and an evaporation section 122. In the illustrated example, the wicking sections 120 of the absorbers 118 are positioned below the insulation barrier 116 (e.g., in the body of water 104) and the evaporation sections 122 of the absorbers 118 are positioned above the insulation barrier 116 (e.g., suspended in the interior space 106). As the wicking sections 120 absorb salt water from the body of water 104, the salt water is transferred to the interior space 106 via capillary action. Thus, the example absorbers 118 of FIG. 1 carry non-purified water from the body of water 104 into the interior space 106, where the non-purified water can be evaporated. Notably, the example absorbers 118 of FIG. 1 are suspended from the frame 102 such that the absorbers 118 wick the non-purified water away from the insulation barrier 116 and such that evaporation occurs closer to the condensation collection surfaces 108 than the insulation barrier 116. Due to the suspension of the absorbers 118 from the frame 102 and the resulting evaporation section 122 of the absorbers 118 being proximate the condensation collection surfaces 108, more evaporated water condenses on the condensation collection surfaces 108 rather than other surfaces (e.g., the top surface of the insulation barrier 116).

In some examples, the absorbers 118 are rigidly coupled to the frame 102. Alternatively, the absorbers 118 may be movable. In the illustrated example of FIG. 1, the absorbers 118 are coupled to the frame 102 via an actuator 124 capable of raising and lowering the absorbers 118 relative to, for example, the frame 102. In some examples, the actuator 124 collectively controls all of the absorbers 118. In some examples, the actuator 124 includes a plurality of actuators to control individual ones of the absorbers 118. In the example of FIG. 1, the example actuator 124 controls a position of the example absorbers 118 during an evaporation mode of operation such that the wicking sections 120 represent a particular percentage (e.g., twenty-five (25) percent) of the absorbers 118.

In the illustrated example of FIG. 1, the evaporation mode of operation corresponds to normal operation of the purification structure 100 to desalinate the water. In some examples, the example actuator 124 controls the position of the example absorbers 118 during a cleaning mode of operation such that the wicking sections 120 represent a percentage (e.g., seventy-five (75) percent) of the absorbers 118 different than the percentage corresponding to the evaporation mode of operation.

In the illustrated example of FIG. 1, the cleaning mode of operation is entered occasionally to clear the absorbers 118 of salt and/or sediment that have built up on the absorbers 118 over time. That is, the example actuator 124 of FIG. 1 submerges a greater percentage of the absorbers 118 into the body of water 104 relative to the evaporation mode of operation such that the sections of the absorbers 118 that are suspended in the interior space 106 during the evaporation mode are rinsed off to remove or reduce salt and/or sediment buildup. Cleaning the absorbers 118 enables more efficient transfer of water into the interior space 106 via capillary action. In some examples, the actuator 124 of FIG. 1 enters the cleaning mode of operation according to a schedule. Additionally or alternatively, the actuator 124 of FIG. 1 enters the cleaning mode of operation according to one or more accumulation sensors 125 capable of determining an amount of salt buildup and/or sediment buildup on the absorbers 118. The example purification structure 100 of FIG. 1 includes a controller 126 to operate, for example, the actuator 124. An example controller 126 to facilitate the movement of the absorbers 118 is disclosed below in connection with FIGS. 2-3. The example controller 126 maintains a cleaning schedule and receives signals from the accumulation sensors 125 to control the cleaning of the absorbers 118.

The example purification structure 100 of FIG. 1 includes one or more attachment points 128 to enable the purification structure 100 to be, for example, towed for transport. In some examples, the reservoir 110 may be emptied before transport to enable the purification structure 100 to sit higher in the body of water 104. Further, after the purification structure 100 has been transported to a destination, the reservoir 110 may be again emptied to rid the reservoir 110 of any contamination (e.g., salt water that inadvertently entered the reservoir 110 during transport). Additionally or alternatively, the attachment points 128 may be used by a vessel to enable boarding of the purification structure 100. In some examples, the attachment points 128 are utilized to attach multiple instances of the purification structure 100 together to form a floating island.

The example purification structure 100 of FIG. 1 includes an extraction mechanism 130 in fluid communication with the contents of the reservoir 110. The example extraction mechanism 130 of FIG. 1 includes, for example, one or more tubes through which the contents of the reservoir may be extracted by, for example, an extraction vessel moored to the connection points 128. Additionally or alternatively, the extraction mechanism 130 may include tubes that extend to a collection station on shore. In the illustrated example of FIG. 1, the reservoir 110 is emptied according to a schedule. Additionally or alternatively, the reservoir 110 is emptied according to reading taken by one or more water level sensors 131 deployed in connection with the reservoir 110 that determine a current volume of liquid present in the reservoir 110. As described in detail below, the example controller 126 maintains an extraction schedule and receives signals from the water level sensors 131 to control extraction of the contents of the reservoir.

The example purification structure 100 of FIG. 1 includes one or more lights 132. In the illustrated example, the lights 132 are solar powered lights that utilize energy collected by one or more solar collection panels 134. In some examples, the solar collection panels 134 additionally or alternatively supply power to the example controller 126.

The example purification structure 100 of FIG. 1 may include a landing platform for use by, for example, a helicopter. In some examples, the purification structure 100 is wider than it is tall to provide stability from being tipped over. In the illustrated example, the purification structure 100 includes one or more sealed flotation tanks or pontoons 136. If the example purification structure 100 of FIG. 1 is flipped over but not sunken, the flotation tanks can be selectively flooded to sink one edge of the purification structure 100, thereby making the purification structure 100 float vertically. From this position, a tug can turn the purification structure 100 to an upright position.

Figure 2:
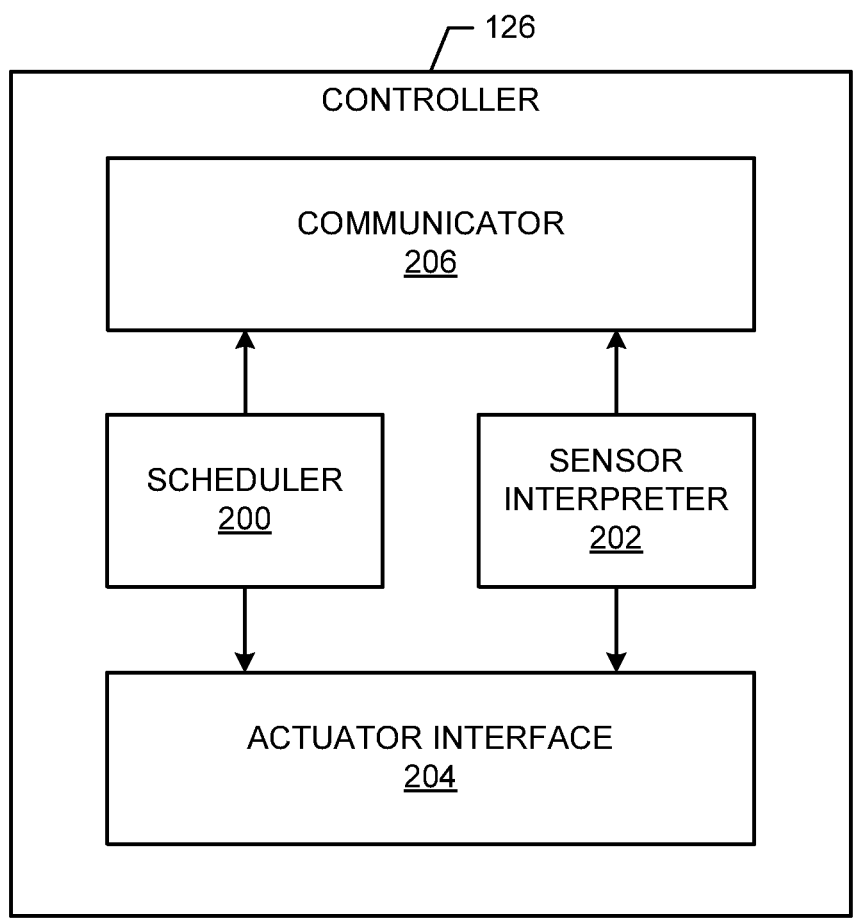
FIG. 2 is a block diagram of an example implementation of a controller for the example purification and collection apparatus of FIG. 1.

FIG. 2 is a block diagram representative of an example implementation of the example controller 126 of FIG. 1. The example controller 126 of FIG. 2 controls positioning of the example absorbers 118 of FIG. 1. The example controller 126 of FIG. 2 includes a scheduler 200 to track one or more schedules. In the illustrated example of FIG. 1, the scheduler 200 maintains and references a cleaning schedule associated with the cleaning mode of operation for the absorbers 118. In particular, the example absorbers 118 may accumulate salt and/or sediment over time and the example scheduler 200 of FIG. 2 indicates times at which the absorbers 118 are to be cleaned to reduce or eliminate the accumulated salt and/or sediment. In some examples, the cleaning schedule utilized by the example scheduler 200 is configured according to one or more environmental factors such as, for example, a salt concentration of the particular body of water in which the purification structure 100 is being deployed, a sediment concentration of the body of water, a turbulence of the body water, and/or any other factor that may contribute to the accumulation of salt and/or sediment on the absorbers 118. In the illustrated example of FIG. 2, the example scheduler 200 applies a collective cleaning schedule to all of the absorbers 118. However, the example scheduler 200 may maintain different schedules for individual ones of the absorbers 118 when, for example, individual one(s) of the absorbers 118 have been replaced.

Additionally, the example scheduler 200 maintains and references an extraction schedule associated with the reservoir 110. In particular, the extraction schedule includes periodic dates on which the reservoir 110 is scheduled for extraction. In some examples, the extraction schedule is configured based on, for example, expected production levels of fresh water, past production levels of fresh water, and/or any other measurement indicative of a frequency at which the reservoir 110 should be emptied.

The example controller 126 of FIG. 2 includes a sensor interpreter 202 to receive and analyze signals from one or more sensors deployed on the purification structure 100. In the illustrated example of FIG. 2, the sensor interpreter 202 receives signals from the accumulation sensors 125 associated with the absorbers 118 that indicate an amount of salt and/or sediment accumulation on the absorbers 118. The example sensor interpreter 202 of FIG. 2 determines whether a cleaning of the absorbers 118 should be performed based on the signals received from the accumulation sensors 125. For example, the sensor interpreter 202 may determine that the accumulation sensors 125 indicate that a threshold amount of salt and/or sediment accumulation is present on the absorbers 118. In the illustrated example of FIG. 2, the sensor interpreter 202 aggregates readings from the individual accumulation sensors 125 to generate a collective (e.g., average) accumulation indicator. In the illustrated example of FIG. 2, the example sensor interpreter 202 compares the collective accumulation indicator to a collective accumulation threshold to determine whether the absorbers 118 should be collectively (e.g., at a same time) cleaned. Alternatively, the sensor interpreter 202 may compare individual readings from the individual accumulation sensors 125 to generate individual accumulation indicators. In such examples, the sensor interpreter 202 compares the individual accumulation indicators to individual accumulation thresholds to determine whether the corresponding ones of the absorbers should be individually cleaned.

Additionally, the example sensor interpreter 202 of FIG. 2 receives signals from one or more water level sensors 131 associated with the reservoir 110 that indicate an amount of fresh water currently present in the reservoir 110. The example sensor interpreter 202 determines whether the reservoir 110 should be emptied based on the signals received from the water level sensors 131. For example, the sensor interpreter 202 may determine that the water level sensors indicate that a threshold amount of fresh water is currently present in the reservoir 110.

When the example scheduler 200 of FIG. 2 and/or the example sensor interpreter 202 of FIG. 2 determines that the absorbers 118 are to be cleaned (e.g., individually or collectively), the example scheduler 200 and/or the example sensor interpreter 202 communicate a message to an actuator interface 204. The example actuator interface 204 of FIG. 2 is in communication with the example actuator 124 of FIG. 1. When the absorbers 118 are to be cleaned, the example actuator interface 204 of FIG. 2 causes the actuator 124 to enter the cleaning mode of operation in which the absorbers 118 are further lowered into the body of water 104 (relative to the position corresponding to the evaporation mode of operation). The example actuator interface 204 causes the actuator 124 to leave the absorbers 118 in the lowered position for a particular duration, after which the absorbers 118 are raised back into the position corresponding to the evaporation mode. In the illustrated example of FIG. 2, the absorbers 118 are lowered and raised collectively. However, the example actuator 124 may control individual ones of the actuators 118 in accordance with commands received from the actuator interface 204.

When the example scheduler 200 of FIG. 2 and/or the example sensor interpreter 202 of FIG. 2 determines that the reservoir 110 is to be emptied, the example scheduler 200 and/or the example sensor interpreter 202 communicate a message to a communicator 206. The example communicator 206 of FIG. 2 is capable of communicating (e.g., via a network, satellite, etc.) with, for example, an extraction entity tasked with emptying the reservoir 110 of the purification structure 100. For example, the communicator 206 of FIG. 2 may send a message to an extraction vessel to be deployed to the purification structure 100 when the reservoir 110 is full and/or scheduled for extraction. The message conveyed by the example communicator 206 includes, for example, a location (e.g., coordinate) of the purification structure 100 such that the extraction vessel can locate the purification structure 100.

While an example manner of implementing the controller of FIG. 1 is illustrated in FIG. 2, one or more of the elements, processes and/or devices illustrated in FIG. 2 may be combined, divided, re-arranged, omitted, eliminated and/or implemented in any other way. Further, the example scheduler 200, the example sensor interpreter 202, the example actuator interface 204, the example communicator 206 and/or, more generally, the example controller 126 of FIG. 2 may be implemented by hardware, software, firmware and/or any combination of hardware, software and/or firmware. Thus, for example, any of the example scheduler 200, the example sensor interpreter 202, the example actuator interface 204, the example communicator 206 and/or, more generally, the example controller 126 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example scheduler 200, the example sensor interpreter 202, the example actuator interface 204, the example communicator 206 and/or, more generally, the example controller 126 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example controller 126 of FIG. 1 may include one or more elements, processes and/or devices in addition to, or instead of, those illustrated in FIG. 2, and/or may include more than one of any or all of the illustrated elements, processes and devices.

Figure 3:
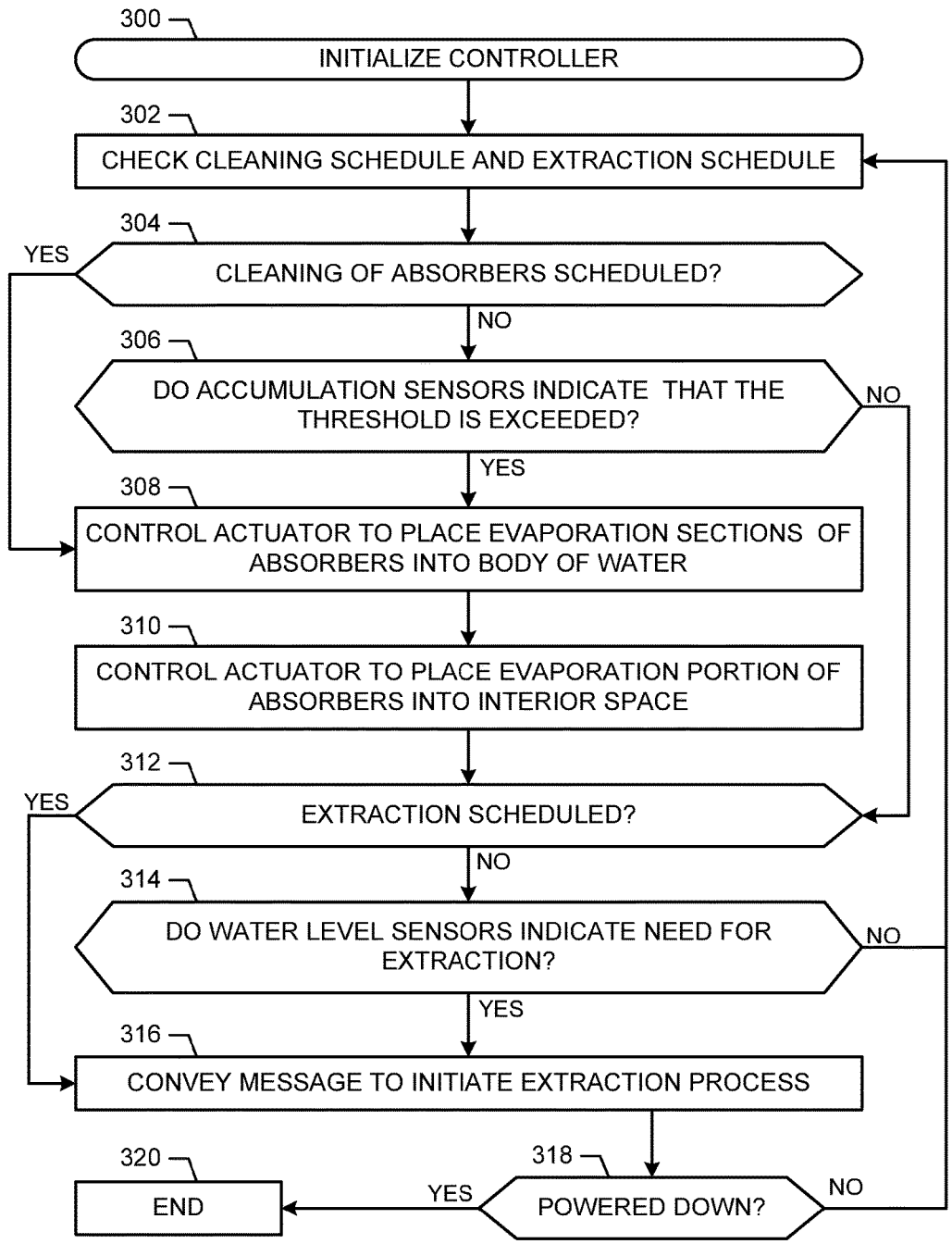
FIG. 3 is flowchart representative of machine readable instructions that may be executed to implement the example controller of FIG. 2.

A flowchart representative of example machine readable instructions for implementing the controller 126 of FIG. 2 is shown in FIG. 3. In this example, the machine readable instructions comprise a program for execution by a processor such as the processor 412 shown in the example processor platform 400 discussed below in connection with FIG. 4. The program may be embodied in software stored on a tangible computer readable storage medium such as a CD-ROM, a floppy disk, a hard drive, a digital versatile disk (DVD), a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the example controller 126 may alternatively be used. For example, the order of execution of the blocks may be changed, and/or some of the blocks described may be changed, eliminated, or combined.

As mentioned above, the example processes of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example of FIG. 3 begins with an initialization of the example controller 126 (block 300). Initialization of the example controller 126 coincides with, for example, deployment of the example purification structure 100 on the body of water 104. Initialization of the example controller 126 includes, for example, obtaining the cleaning schedule and/or the extraction schedule from an entity tasked with operating and/or maintaining the example purification structure 100. In the illustrated example of FIG. 3, the example absorbers 118 are deployed with the evaporation sections 122 suspended from the frame 102 and the wicking sections 120 submerged in the body of water 104 via the openings in the insulation barrier 116.

In the example of FIG. 3, the scheduler 200 (FIG. 2) checks the cleaning schedule and the extraction schedule to determine whether the absorbers 118 are to be cleaned and/or whether the reservoir 110 is scheduled for extraction (block 302). In the illustrated example of FIG. 3, the cleaning schedule applies to the absorbers 118 collectively. However, individual cleaning schedules may be maintained for individual ones of the absorbers 118 when, for example, particular ones of the absorbers 118 have been replaced. If the cleaning schedule does not indicate that the absorbers 118 are to be cleaned (block 304), the example sensor interpreter 202 determines whether the accumulation sensors 125 indicate that a current amount of salt and/or sediment built up on the absorbers 118 exceeds a threshold (block 306). In the illustrated example of FIG. 3, readings from the accumulation sensors 125 are aggregated such that the absorbers 118 are treated collectively for purposes of cleaning. However, individual readings and thresholds may be applied to the individual ones of the absorbers 118.

If the absorbers 118 are scheduled to be cleaned (e.g., collectively or individually) (block 304) or the accumulation sensors 125 indicate that the accumulation threshold is exceeded (block 306) (e.g., collectively or individually), the example actuator interface 204 receives a message or command from the corresponding one(s) of the scheduler 200 and the sensor interpreter 202 instructing the actuator interface 204 to enter the cleaning mode of operation. As such, the example actuator interface 204 controls the actuator 124 to lower the absorbers 118 (e.g., collectively or individually) further into the body of water 104 relative to the evaporation mode of operation (block 308). In particular, the actuator interface 204 instructs the actuator 124 to lower the evaporation sections 122 of the absorbers 118 into the body of water 104 such that the evaporation sections 122 are cleaned (e.g., salt and/or sediment is washed away from the absorbers 118) by the body of water 104. After the evaporation sections 122 of the absorbers 118 have been cleaned by the body of water 104 (e.g., placed in the body of water 104 for a designated duration), the example actuator interface 204 instructs the actuator 124 to position the evaporation sections 122 of the absorbers into the interior space 106 (block 310).

In the example of FIG. 3, the scheduler 200 determines whether the extraction schedule indicates that the reservoir 110 should be emptied (block 312). If an extraction is not scheduled (block 312), the example sensor interpreter 202 determines whether the water level sensors 131 indicate that amount of liquid in the reservoir 110 exceeds a threshold (block 314). If the either the scheduler 200 determines that the extraction schedule indicates that the reservoir 110 should be emptied (block 312) or the sensor interpreter 202 determines that the water level exceeds the threshold (block 314), the example communicator 206 conveys a message to, for example, an extraction vessel indicating that the reservoir 110 should be emptied to initiate an extraction process (block 316).

If the controller 126 is powered down (block 318), the example of FIG. 3 ends (block 320). Otherwise, control returns to block 302.

Figure 4:
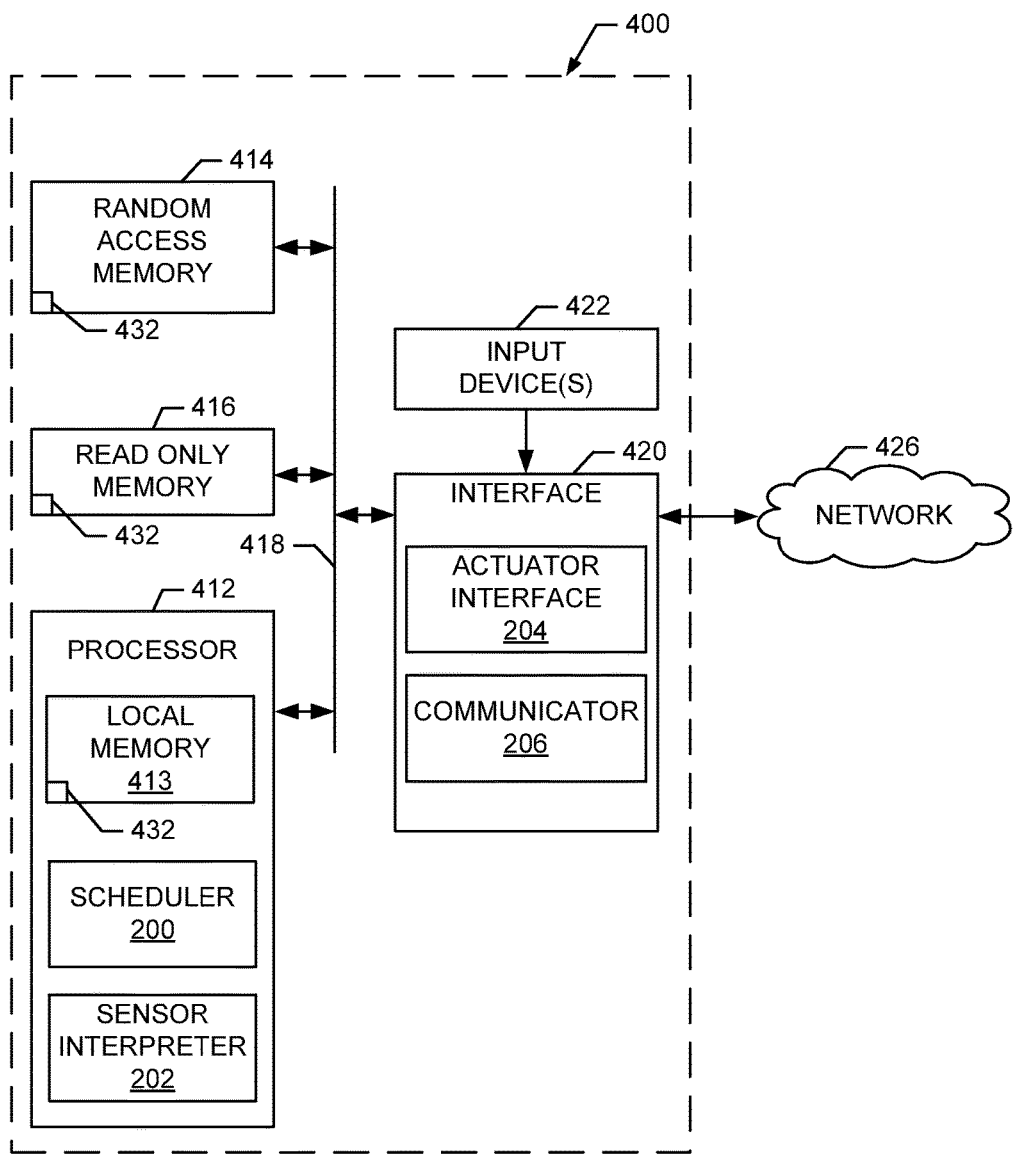
FIG. 4 is a block diagram of an example processing system implementing the controller of FIGS. 1 and/or 2 by executing the example machine readable instructions of FIG. 3.

FIG. 4 is a block diagram of an example processor platform 400 that has been repurposed to execute the instructions of FIG. 3 to implement the example controller 126 of FIGS. 1 and/or 2. The processor platform 400 can be, for example, a microcontroller (e.g., an application specific integrated circuit (ASIC), a programmable logic device (PLD), a field programmable logic device (FPLD)), a server, or any other type of computing device. The example processor platform 400 of FIG. 4 is one that can operate on power levels commensurate with energy collected by solar panels and/or a combination of solar panels and backup batteries.

The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer. The example processor 412 of FIG. 4 implements the example scheduler 200 of FIG. 2 and the example sensor interpreter 202 of FIG. 2.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and commands into the processor 412. The input device(s) 422 can be implemented by, for example, an audio sensor, a microphone, a camera (still or video), a keyboard, a button, a mouse, a touchscreen, a track-pad, a trackball, isopoint and/or a voice recognition system.

In some examples, one or more output devices (e.g., a light emitting diode (LED), an organic light emitting diode (OLED), a liquid crystal display, a cathode ray tube display (CRT), a touchscreen, a tactile output device, a printer and/or speakers) may be connected to the interface circuit 420. However, in the interest of conserving energy and operating at low power levels due to the isolated nature of the example purification structure 100 of FIG. 1, the example processor platform does not include output devices.

The interface circuit 420 of the illustrated example includes the communicator 206, which may be implemented by, for example, a transmitter, a receiver, a transceiver, a modem and/or network interface card to facilitate exchange of data with external machines (e.g., computing devices of any kind) via a network 426 (e.g., a wireless Ethernet connection, a cellular telephone system, etc.). The interface circuit 420 of the illustrated example includes the actuator interface 204, which is in communication with the example actuator 124 of FIG. 1 to control the actuator 124 and the corresponding absorbers 118.

In some examples, the processor platform 400 includes one or more mass storage devices (e.g., floppy disk drives, hard drive disks, compact disk drives, Blu-ray disk drives, RAID systems, and digital versatile disk (DVD) drives). However, in the interest of conserving energy and operating at low power levels, the example processor platform 400 does not include a mass storage device.

Coded instructions 432, such as the machine readable instructions of FIG. 3, may be stored in the volatile memory 414, the non-volatile memory 416, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a frame to define an interior space, the frame having an inner surface in contact with air of the interior space;
   a barrier positioned between a body of liquid and the interior space;
   an absorber suspended from the frame to transfer liquid from the body of liquid into the interior space via an opening in the barrier; and
   a controller to control movement of the absorber into the body of liquid in response to an indication that the absorber is to be cleaned.

2. The apparatus of claim 1, wherein the barrier includes insulation material.

3. The apparatus of claim 1, wherein the absorber includes:
   a wicking section to be placed in the body of liquid; and
   an evaporation section to be placed in the interior space.

4. The apparatus of claim 3, wherein the absorber is to transfer the liquid from the wicking section to the evaporation section via capillary action.

5. The apparatus of claim 1, including a reservoir to store condensation formed on the inner surface of the frame.

6. The apparatus of claim 1, wherein the controller is to convey a message to an extraction entity in response to an indication that a reservoir is to be emptied, wherein the reservoir is to collect condensation from the inner surface.

7. The apparatus of claim 1, including a flotation structure.

8. An apparatus, comprising:
   a dome-shaped frame;
   a reservoir defined in part by the dome-shaped frame, the reservoir to collect condensation forming on a first surface of the dome-shaped frame;
   an absorber suspended from the dome-shaped frame to transfer, via capillary action, liquid from a body of liquid into an interior space defined by the dome-shaped frame;
   an insulator to prevent condensation from forming on a surface of the body of liquid; and
   a sensor to detect an amount sediment or salt accumulation on the absorber.

9. The apparatus of claim 8, wherein the dome-shaped frame includes a center exterior portion and an outer exterior portion, the center exterior portion having a first degree of reflectivity, the outer exterior portion having a second degree of reflectivity greater than the first degree of reflectivity.

10. The apparatus of claim 8, including an opening in the insulator to receive the absorber.

11. The apparatus of claim 8, including a controller to facilitate movement of the absorber into the body of liquid in response to readings of the sensor.

\* \* \* \* \*